June 10, 1969     A. O. DE HART     3,449,028

ANTI-CAVITATION BEARING GROOVING

Filed Sept. 22, 1965

INVENTOR.
Arnold O. DeHart
BY
Paul Fitzpatrick
ATTORNEY

United States Patent Office 3,449,028
Patented June 10, 1969

3,449,028
ANTI-CAVITATION BEARING GROOVING
Arnold O. De Hart, Warren, Mich., assignor to General Motors Corporation, Detroit, Mich., a corporation of Delaware
Filed Sept. 22, 1965, Ser. No. 489,167
Int. Cl. F16c *33/66, 17/02;* B61f *17/00*
U.S. Cl. 308—122                                4 Claims

ABSTRACT OF THE DISCLOSURE

A hydrodynamic type plain bearing for a shaft subjected to a high fluctuating radial load is provided with a circumferential groove on each side of its central lubricant supply groove in the area of the bearing diametrically opposed to the high fluctuating load. These circumferential grooves are fluidly connected to the central supply groove and prevent cavitation erosion of this area of the bearing.

---

My invention relates to bearings in general and to hydrodynamic plain bearings in particular. A hydrodynamic type plain bearing is one which utilizes a hydraulic fluid or lubricant layer between the bearing surface and a relatively movable part to support the part so that it does not touch the bearing surface under normal operating conditions. One type of hydrodynamic bearing support is analogous to two plates with hydraulic fluid between them. As one plate is moved toward the other plate, the fluid being incompressible, its pressure will increase until it is sufficient to oppose the force moving the one plate whereupon the one plate is dynamically supported by the fluid. This hydrodynamic type of bearing is to be distinguished from the boundary layer type of plain bearing lubrication wherein a thin film of lubricant is provided between the bearing surface and the movable part. In the latter case, the thin layer no longer acts as a liquid in the classic sense. The thin layer adheres to and effectively becomes a part of the bearing surfaces so that the metallic surfaces are prevented from coming into intimate contact with each other. In the former case, the layer is relatively thick and utilizes internally generated pressure to separate the bearing surfaces.

One of the problems inherent with a hydrodynamic type bearing is in connection with a rotating shaft which is subjected to varying radial loads particularly when the load reverses direction. Because the film thickness in a hydrodynamic type bearing is relatively thick compared to the film lubricant type bearing, the shaft will have more room within which to move eccentrically with respect to the bearing. As the radial loads vary, the shaft moves eccentrically with respect to the bearing in the direction of the radial load being applied until it is stopped by hydraulic pressure build up as previously discussed. When the rate of load application becomes excessively high, as in the case of some compression ignition engines, the shaft moves rapidly in the direction of the radial load. This action creates a rapidly expanding space between the shaft and the bearing on the opposite side of the shaft. The hydrodynamic fluid cannot fill this rapidly expanding space quickly enough. Consequently, a tension is generated in the liquid. While specially prepared liquids can withstand liquid tension for a short period of time, the dissolved gases and volatile products in normal lubricating fluids rapidly form bubbles under the liquid tension in the fluid. When the applied radial load is removed, the shaft again moves toward concentricity, and the bubbles collapse under the increasing pressure field as the clearance is decreased. The collapsing bubbles are responsible for an effect known as cavitation erosion which reduces the life of the bearings.

The object of my invention is to provide a hydrodynamic plain bearing which is capable of supporting a rotating shaft subjected to high varying radial loads and having means to prevent cavitation erosion usually associated therewith.

Another object of my invention is to provide a hydrodynamic plain bearing which is capable of supporting a rotating shaft subjected to high varying radial loads and having means to prevent cavitation erosion usually associated therewith without reducing the load bearing capabilities of the bearing.

These and other objects of my invention will hereinafter become more fully apparent from the following description of the annexed drawings, which illustrate a preferred embodiment, and wherein.

Figure 1:
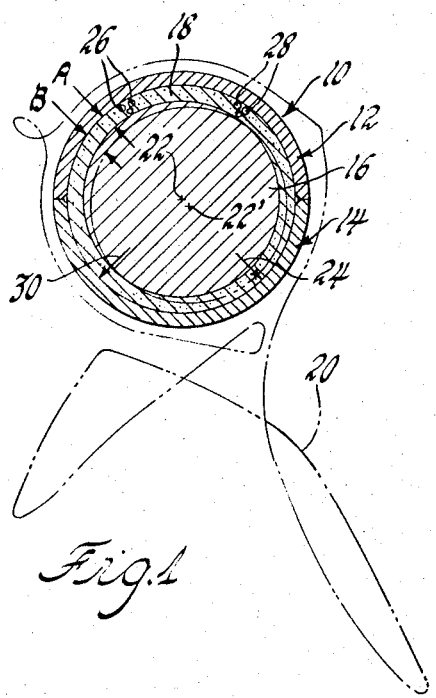
FIGURE 1 is a schematic view of a plain hydrodynamic bearing showing a typical pattern of varying radial loads in polar form.

Referring now to FIGURE 1, there is shown a plain bearing 10 comprising upper and lower semicircular halves 12 and 14, respectively. A shaft 16 is disposed within the bearing 10 with a hydrodynamic layer 18 of lubricant between the outer circumference of the shaft 16 and the inner surface of the bearing 10. The thickness of the hydrodynamic layer 18 is greatly exaggerated for purposes of illustration. The broken line 20 shows a pattern of varying radial loads for the shaft 16. This pattern is typical of a pattern of varying radial loads which would be experienced by the crankshaft of a four stroke, eight cylinder, compression ignition, internal combustion engine at one of its main bearing locations. When the shaft 16 is unloaded, both the main bearing 10 and the shaft 16 are concentric with the shaft 16 rotating about the center 22. When a high radial force such as the one represented by the arrow 24 is encountered, the shaft 16 moves radially in the direction of the arrow 24 to the dotted line position where its center is at 22'. In other words, the shaft 16 becomes eccentric with respect to the bearing 10. With the movement of the shaft 16 in the direction of the arrow or applied load 24, the space on the opposite side of the shaft 16 has increased from a thickness of A to a thickness of B. When the applied load 24 is excessively high as in the compression ignition engine, the movement of shaft 16 from center 22 to center 22' and likewise the increase of thickness of the diametrically opposed space from A to B is rapid. In such a situation with present bearing designs, sufficient lubricant is not available to fill this rapidly expanding space with the result that bubbles 26 are formed in the lubricant layer at this point. When the radial load is decreased, the shaft 16 moves toward concentricity, and the bubbles 26 collapse and erode the bearing surface. In like manner, bubbles 28 are formed and collapsed at a point diametrically opposite of the area which is subjected to the high radial load represented by the arrow 30.

The erosion which takes place at these points is not uniform across the axial section of the bearing. This can be explained by reference to the left half of FIGURE 4 which shows an axial section of a prior art plain bearing 32. The plain bearing 32 has a single central oil supply groove 34. The axial pressure profile of the plain bearing 32 is shown below the axial section. The pressure at the outside edges of the bearing is ambient or zero gauge pressure. The pressure in the oil supply groove is that of the oil supply $P_L$ and is positive. The cavitation erosion was found to be concentrated on the bearing surface axially midway between the oil supply groove and the edge of the bearing where the pressure reaches its most negative value. The erosion concentration is thus precisely located. It is radially opposite the high loads and axially midway between the oil supply groove and the bearing edge where the negative pressure peaks.

Figure 2:
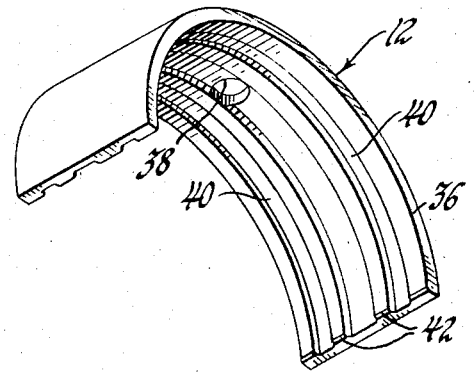
FIGURE 2 is a perspective view of the upper half of the plain bearing in accordance with my invention shown schematically in FIGURE 1.

Referring now to FIGURE 2, the solution to the problem is shown. FIGURE 2 shows the upper or lightly loaded half 12 of the bearing 10 shown schematically in FIGURE 1. The upper half 12 surrounds that portion of the shaft 16 which is opposite to the portion having the high applied radial loads 24 and 30. The bearing half 12 has a central lubricant supply groove 36 as in the prior art bearing and the groove 36 is provided with a port or inlet 38 which extends to the outer surface of the bearing. The lands on either side of the groove 36 each have a single anti-cavitation groove 40 which is located midway between the oil supply groove 36 and the outer edge of the bearing half 12. Transverse passages 42 connect each of the anti-cavitation grooves 40 with the oil supply groove 36. As shown, the transverse passage 42 is formed by chamfering the axial edge of the bearing half 12, however, it could be machined in anywhere along the inner circumference.

Figure 3:
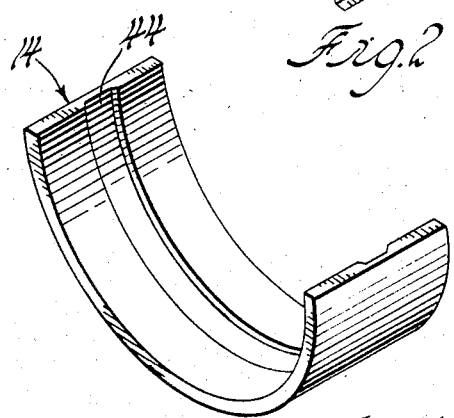
FIGURE 3 is a perspective view of the lower half of the plain bearing in accordance with my invention shown in FIGURE 1.

The lower or loaded bearing half 14 is shown in FIGURE 3. The lower bearing half 14 may have a central supply groove 44, however, in some applications, the supply groove 44 may be omitted. This is especially true where exceptionally high radial loads are encountered. Since without the central supply groove, a larger bearing support surface area capable of supporting higher loads is provided.

Figure 4:
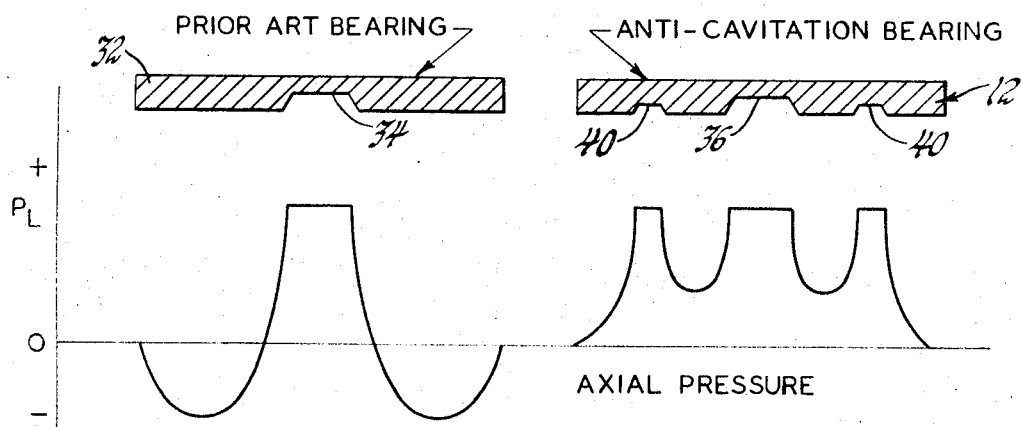
FIGURE 4 is a composite showing the cross sections and axial pressure profiles, respectively, for a standard prior art bearing and a bearing corresponding to the upper bearing half shown in FIGURE 3.

Referring now to the right half of FIGURE 4, an axial section of the upper bearing half 12 and its axial pressure profile are shown. As is evident from the pressure profile, the central supply groove 36 and the anti-cavitation grooves 40 are all at a positive pressure, that is, they are all at the pressure of the lubricant supply source, $P_L$ less any pressure drop encountered in the lubricant flow passages. This is because the anticavitation grooves 40 communicate with the central oil supply groove 36 through the transverse passages 42. The pressure at the axial edges of the bearing is zero gauge or ambient and the pressure is positive, that, above ambient at all other opints. The anti-cavitation grooves 40 thus enable the radial space to fill up with lubricant as its thickness rapidly increases from A to B due to a high radial load 24 being applied at a diametrically opposite point. This, in turn, prevents negative pressure at this point and bubbles are not formed. With the elimination of the bubbles, there are no bubbles to collapse and consequently no cavitation erosion. I have found that one groove in each land midway between the lubricant supply groove and the edge is sufficient for all plain bearings having length-to-diameter ratios within the range of present day designs. Of course, the bearing need not be halved as only the portion which is adjacent the shaft section diametrically opposite to the section subjected to high radial loads need have the anti-cavitation grooves 40. This portion may be even less extensive as that illustrated in FIGURE 1. For instance, in an in-line six cylinder, four stroke engine, only one high radial load occurs and that is in the substantially vertically downward direction. In such a case, only the substantially vertically upward section of the upper half will be subjected to the anti-cavitation erosion. However, in most instances, manufacturing techniques will dictate that the bearings be halved, that is, comprise upper and lower semi-circular sections with one half being the lightly loaded section with the anti-cavitation grooves. Also while the plain bearing 10 was shown without radial flanges, obviously my invention is equally applicable to plain bearings having radial flanges.

One of the readily apparent advantages of my invention is that while I have eliminated the problem of anti-cavitation erosion, I have not altered the bottom or highly loaded half so that the load carrying capabilities of my invention are not lessened.

Various modifications are contemplated and may obviously be resorted to by those skilled in the art without departing from the spirit and scope of the invention, as hereinafter defined by the appended claims, as only a preferred embodiment thereof has been disclosed.

I claim:

1. A hydrodynamic plain bearing subjected to varying radial loads, comprising:
   a first portion disposed adjacent the area of a shaft which experiences high radial loads and having a central internal circumferential supply groove, and
   a second portion forming a closed cylinder with said first portion with a fluid film between the shaft and said cylinder, said second portion having a central internal circumferential lubricant supply groove, an internal circumferential anti-cavitation groove portion on each side of said central groove, and means to supply lubricant to said anti-cavitation grooves, said second portion being disposed adjacent the area diametrically opposite said highly loaded area whereby said shaft is supported by said first portion under high radial loads with said anti-cavitation grooves maintaining said fluid film between said second portion and said oposite area above atmospheric pressure to prevent cavitation erosion of said second portion.

2. A hydrodynamic plain bearing for a hydrodynamic journal subjected to varying radial loads, comprising:
   a first portion disposed adjacent the area of a shaft which experiences high radial loads, said first portion having a central internal circumferential supply groove, and
   a second portion forming a closed cyclinder with said first portion, said cylinder encircling said shaft with a hydrodynamic layer of lubricant therebetween, said second portion being disposed adjacent the area of said shaft opposite said highly loaded area and having a central internal circumferential supply groove, a lubricant supply port in said groove extending radially to the outer surface of said second portion, an internal circumferential anti-cavitation groove in said second portion on each side of said central groove midway between said central supply groove and an axial edge of said second portion, and
   means to fluidly connect said central groove with said anti-cavitation groove whereby said shaft is supported by said second portion under high radial loads with said anti-cavitation grooves maintaining said hydrodynamic lubricant layer between said second portion and said opposite area above atmospheric pressure to prevent cavitation erosion of said second portion.

3. A hydrodynamic plain bearing subjected to varying radial loads, comprising:
   a first semicircular bearing half disposed adjacent the area of a shaft which experiences high radial loads, and
   a second semicircular bearing half forming a closed cylinder with said first half which encircles said shaft with a fluid film therebetween, said second semicircular half having a central internal circumferential lubricant supply groove, an internal circumferential anti-cavitation groove on each side of said central groove midway between said central groove and the respective axial edge of said bearing half, and
   a chamfer at one circumferential edge of said second bearing half to fluidly connect said central groove with said anti-cavitation grooves, said second half being disposed adjacent the area diametrically opposite said highly loaded area whereby said shaft is supported by said first half under high radial loads with said anti-cavitation grooves supplying lubricant to the fluid film between said second half and said diametrically opposite area to eliminate formation of bubbles in the fluid film and thereby prevent cavitation erosion of said second half.

4. A hydrodynamic plain bearing subjected to varying radial loads, comprising:
- a first semicircular bearing half having a central circumferential groove, said first half being disposed adjacent the area of a shaft which experiences high radial loads, and
- a second semicircular bearing half adapted to form a closed cylinder with said first portion, said cylinder encircling said shaft with a hydrodynamic layer of lubricant therebetween, said second portion being disposed adjacent the area of said shaft opposite said highly loaded area and having a central internal circumferential supply groove, a lubricant supply port in said groove extending radially to the outer surface of said second portion, an internal circumferential anti-cavitation groove on each side of said central groove midway between said central supply groove and an axial edge of said second half, and chamfer means to fluidly connect said central groove with said anti-cavitation groove whereby said shaft is supported by said second portion under high radial loads with said anti-cavitation grooves supplying lubricant to said hydrodynamic lubricant layer between second half and said diametrically opposite area to eliminate formation of bubbles and thereby prevent cavitation erosion of said second half.

References Cited

UNITED STATES PATENTS

| 3,386,783 | 6/1968 | Scheufler | 308—121 |
| 1,900,593 | 3/1933 | Wade | 308—122 |
| 2,258,834 | 10/1941 | Willi | 308—240 |

FOREIGN PATENTS 74,749  5/1917  Austria.

MARTIN P. SCHWADRON, *Primary Examiner.*

FRANK SUSKO, *Assistant Examiner.*

U.S. Cl. X.R.

308—240